United States Patent [19]

Smith

[11] Patent Number: 5,197,193
[45] Date of Patent: Mar. 30, 1993

[54] APPARATUS FOR CUTTING AN ARTICLE INTO SHEETS

[76] Inventor: Lawrence E. Smith, 5463 U.S. Highway 64, Farmington, N. Mex. 87401

[21] Appl. No.: 759,918

[22] Filed: Sep. 13, 1991

[51] Int. Cl.$^5$ ............................................. B23P 19/00
[52] U.S. Cl. ........................................ 30/134; 30/131; 414/740
[58] Field of Search ............... 30/134, 379, 194, 228, 30/229, 131, 180; 83/612, 694, 610, 611, 636; 144/34 E; 294/104, 106; 414/740

[56] References Cited

U.S. PATENT DOCUMENTS

| | | | |
|---|---|---|---|
| 3,530,576 | 9/1970 | Kjennerud | 30/134 |
| 3,661,488 | 4/1972 | Latreille | 83/636 |
| 4,188,721 | 2/1980 | Ramun et al. | 414/470 |
| 4,198,747 | 4/1980 | LaBounty | 414/470 |
| 4,403,431 | 9/1983 | Ramun et al. | 414/470 |
| 4,541,177 | 9/1985 | Hollander | 30/134 |
| 4,543,719 | 10/1985 | Pardoe | 30/134 |
| 4,550,634 | 11/1985 | Speegle | 30/134 |
| 4,660,451 | 4/1987 | Björkheim | 83/612 |
| 4,776,093 | 10/1988 | Gross | 30/134 |
| 4,951,540 | 8/1990 | Gross et al. | 83/694 |

*Primary Examiner*—Frank T. Yost
*Assistant Examiner*—Hwei-Siu Payer
*Attorney, Agent, or Firm*—Dickinson, Wright, Moon, Van Dusen & Freeman

[57] ABSTRACT

An apparatus for cutting an article into sheets includes an upper jaw pivotally mounted to a lower jaw. The lower jaw includes three coplanar cutting edges, and the upper jaw includes three cutting edges which cooperate with those of the lower jaw. Longitudinal cutting edges of the upper jaw are curved along their lengths, and the end element of the upper jaw is slanted with respect to the end element of the lower jaw. The apparatus may be attached to existing mounting points of a backhoe.

3 Claims, 2 Drawing Sheets

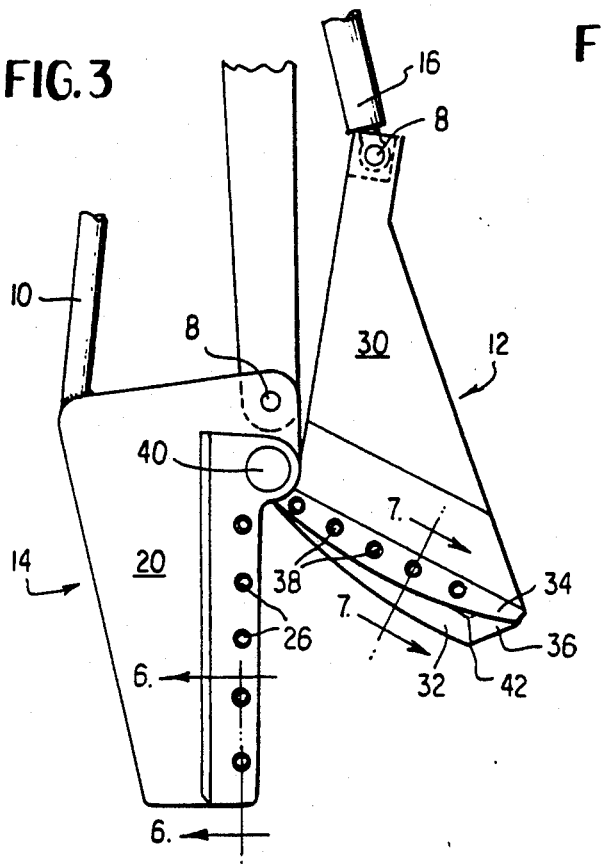
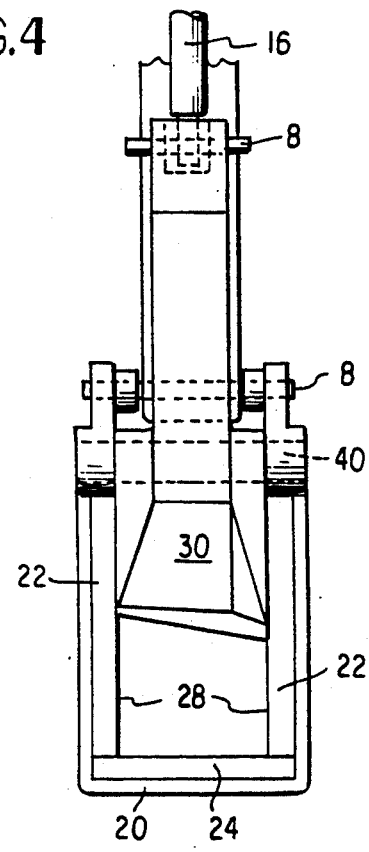
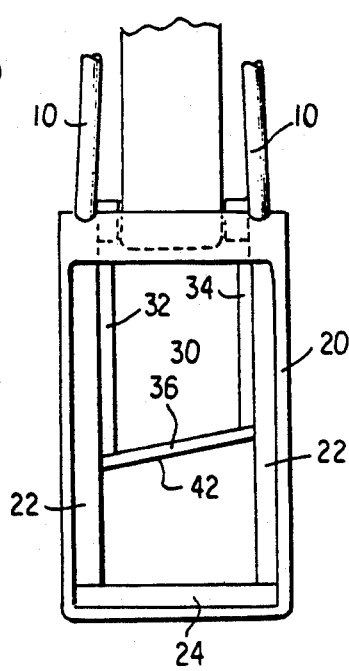
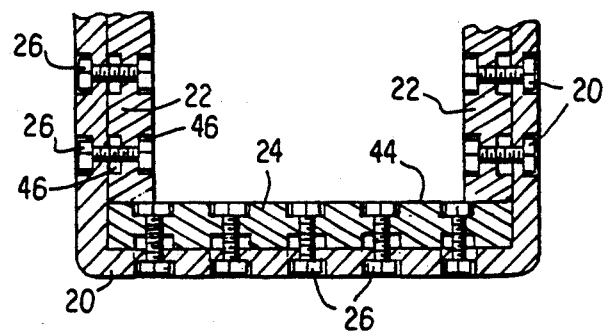
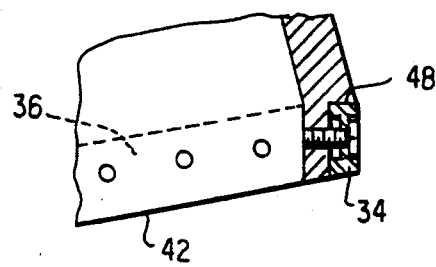

APPARATUS FOR CUTTING AN ARTICLE INTO SHEETS

TECHNICAL FIELD

This invention relates to the art of machines for cutting an article into pieces. In a preferred embodiment, the invention cuts the article into sheets of foundry-acceptable size.

BACKGROUND ART

It is often necessary to cut an article into several pieces. For example, the recycling of the material of a large metal object requires that it be cut into pieces of a size acceptable by a foundry.

Devices are known which are designed to make a single cut and which could be used to cut an article into pieces of a given size. See, for example, U.S. Pat. Nos. 4,903,408 (Tagawa); 4,897,921 (Ramun); 4,872,264 (LaBounty); 4,536,976 (Holopainen); 4,519,135 (LaBounty); 4,403,431 (Ramun); and 4,198,747 (LaBounty). Use of these devices to cut an article into a plurality of pieces is difficult because several cuts are required for each piece.

A device which is designed to cut an article into a sheet of a given size in a single operation is shown in U.S. Pat. No. 4,660,451 (Bjorkheim). This device includes upper and lower jaws wherein each of the jaws includes parallel longitudinal elements and a transverse element extending between the ends of the longitudinal elements. The longitudinal and transverse elements rotate about a pivotal connection such that the longitudinal elements operate much like scissors while the end elements operate in a shearing fashion. This device requires a complicated frame and several hydraulic elements for adjustment and operation of the device.

SUMMARY OF THE INVENTION

In accordance with the invention, a machine is provided which is capable of cutting an article, such as a cylindrical steel tank, into sheets of a size acceptable by a foundry for recycling the material of the tank. The machine of the invention comprises an upper and a lower jaw, the material to be cut being received between these jaws.

The lower jaw includes three cutting elements which are preferably rectangularly arranged such that two of the cutting elements extend parallel to each other to form longitudinal sides, and the third extends transverse to the side elements as an end element. Each of the elements of the lower jaw includes a cutting edge which is preferably linear and coplanar with the cutting edges of the other cutting elements. The elements of the lower jaw are reversible to present a second cutting edge and replaceable on a base of the lower jaw.

The upper jaw includes a base with three cutting elements which are arranged to cooperate with those of the lower jaw to make three intersecting cuts to form the sheets out of the article being demolished. The cutting elements of the upper jaw are designed such that the cutting edges maintain a correct cutting angle with respect to the cutting edges of the elements of the lower jaw. This is accomplished in the preferred embodiment by three features. First, the cutting edges of the longitudinal cutting elements of the upper jaw are curved. Second, the end of one of the longitudinal cutting elements remote from the pivotal connection between the upper and lower jaws is displaced upward whereby the end cutting element of the upper jaw is slanted with respect to the end cutting element of the lower jaw by a desired cutting angle. Third, the longitudinal cutting edges adjacent the pivotal connection between the upper jaw and the lower jaw are below the longitudinal cutting edges of the lower jaw.

Because the end cutting element of the upper jaw moves in an arc about the pivotal connection between the upper and lower jaws, the end element is curved in a longitudinal cross section by a radius which allows the closest spacing between the end element of the upper jaw and the end element of the lower jaw to be at the cutting edges.

BRIEF DESCRIPTION OF THE DRAWINGS

FIG. 3 is a side view of a device in accordance with the invention.

FIG. 4 is a top view of the device.

FIG. 5 is a bottom view of the device.

FIG. 6 is a cross section taken along line 6—6 of FIG. 3.

FIG. 7 is a cross section taken along line 7—7 of FIG. 3.

DETAILED DESCRIPTION OF THE PREFERRED EMBODIMENT

Figure 1:
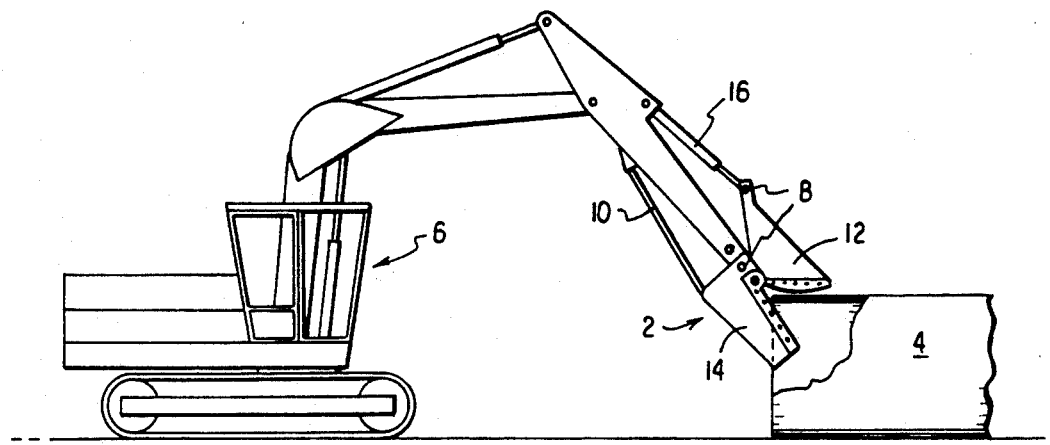
FIG. 1 is a side view of a device in accordance with the invention in a position beginning to cut a sheet out of a tank.

FIG. 1 illustrates use of a preferred embodiment of a device 2 in accordance with the invention to demolish a tank 4, such as an underground tank being salvaged for its value as scrap steel. The device of the invention is attached to a known backhoe 6. The device 2 is preferably mounted on the end of the boom of the backhoe by using existing mounts 8 designed for a bucket (not shown). An additional support brace 10 is provided between the heel of the device 2 and the backhoe boom.

As shown in FIG. 1, the device of the invention comprises an upper jaw 12 pivotally attached to a lower jaw 14. The device can be brought into engagement with the wall of the tank 4 by lifting the upper jaw 12 with respect to the lower jaw 14 by operation of the hydraulic cylinder 16 provided on the backhoe for operation of a bucket.

Figure 2:
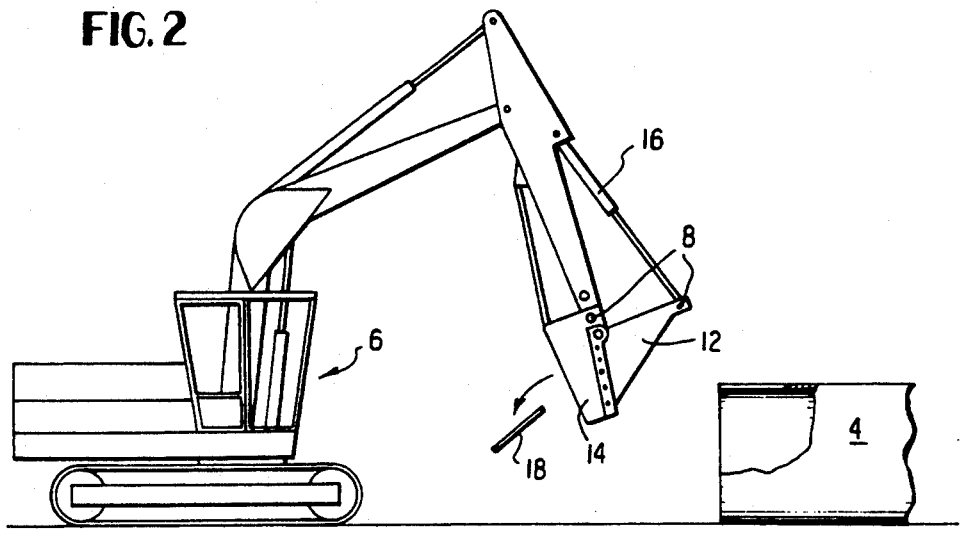
FIG. 2 is a side view of the device shown in FIG. 1 after cutting out the sheet.

FIG. 2 illustrates removal of a sheet of steel 18 from the tank by closing the upper jaw into the lower jaw, the sheet 18 falling through an opening in the lower jaw.

FIGS. 3-7 show the structure of the preferred embodiment in more detail.

Referring to FIGS. 3-5, the lower jaw 14 comprises a base 20 having sidewalls to which longitudinal cutting elements 22 are attached and an end wall to which a transverse cutting element 24 is attached, as by bolts 26. The cutting edges 28 of the lower jaw are preferably coplanar. The interior of the lower jaw is open to allow a cut sheet to fall through the jaw after cutting.

The upper jaw comprises a base 30 to which three cutting elements are attached to cooperate with those of the lower jaw to cut the sheet 18. A first longitudinally extending side cutting element 32 extends generally parallel to a second longitudinally extending side cutting element 34. A third cutting element 36 extends transverse to the side cutting elements 32 and 34 and between their ends. Preferably, the end elements of the upper and lower jaws fit over the ends of the side cutting elements so that the corners of the sheet are cut by the end elements.

The cutting elements are preferably held to the base 30 by bolts 38, and the upper jaw is connected to the lower jaw at pivotal connection 40.

The cutting elements of the upper jaw are arranged to cooperate with those of the lower jaw in such a manner that a desired cutting angle is maintained. To this end, the cutting edges of the side cutting elements are curved. In a preferred embodiment, the side cutting edges are curved throughout their lengths. By this construction, the cutting angle is maintained as the cutting elements of the upper jaw pivot downward with respect to those of the lower jaw during the cutting operation.

The cutting edge of the upper end cutting element is at an angle with respect to the end cutting element of the lower jaw. Thus, the end of the side cutting element 34 remote from the pivot 40 is raised slightly with respect to that of side cutting element 32. In other words, the ends of the side cutting elements 32 and 34 adjacent the pivot 40 and the remote end of side cutting element 32 lie in a plane, and the remote end of side cutting element 34 is above that plane. This allows the end cutting element of the upper jaw to move at a fixed cutting angle with respect to the end cutting element of the lower jaw during the cutting operation.

The end cutting element of the upper jaw is preferably curved in a longitudinal cross section by an amount whereby a clearance is maintained between both the cutting element 36 of base 30 and the cutting edge 44 of end cutting element 24 as the base moves past the end cutting element 24. In addition, the preferred construction provides a path for the cutting edge 42 of the cutting element 36 such that the inner surface 44 of cutting element 24 extends tangent thereto.

FIGS. 6 and 7 show the preferred construction of the cutting elements. Bolts 26 extend through holes in the cutting elements, and recesses 46 are provided on opposite sides of the cutting elements for receiving the heads of bolts or nuts when the cutting elements are in either of two orientations. This allows the cutting elements to be provided with at least two cutting edges and reversed to expose a second edge when a first is worn. All of the cutting edges are preferably mounted in an indentation 48 in the respective base 20 or 30 as illustrated in FIG. 7. This provides additional support for the forces applied to the cutting element.

In operation, the device of the invention is maneuvered by the boom of the backhoe to engage the article being cut between the upper and lower jaws. The upper jaw is driven toward the lower jaw by the hydraulic cylinder 16, and the cut sheet fall through the opening in the lower jaw 14. This is repeated until the article has been demolished.

Modifications within the scope of the appended claims will be apparent to those of skill in the art.

I claim:

1. Apparatus for cutting an article into sheets comprising first jaw means and second jaw means for movement with respect to each other for engaging and cutting said article, said first jaw means comprising facing first longitudinal cutting elements and a first end cutting element extending transversely of respective adjacent ends of said first longitudinal cutting elements, said second jaw means connected to said first jaw means at a pivotal connection and comprising facing second longitudinal cutting elements and a second end cutting element extending transversely of respective adjacent ends of said second longitudinal cutting elements, wherein one of said adjacent ends of said second longitudinal cutting elements is displaced from a plane containing the other of said adjacent ends and opposite ends of said second longitudinal cutting elements, and said second end cutting element lies at an angle with respect to said first end cutting element and includes a curved cutting edge positioned with respect to said pivotal connection such that said first end cutting element lies tangent to a path on which said cutting edge of said second end cutting element moves as said first jaw means moves with respect to said second jaw means.

2. Apparatus according to claim 1 wherein each of said second longitudinal cutting elements includes a nonlinear cutting edge extending from a respective said opposite end to a respective adjacent end.

3. Apparatus for cutting an article into sheets comprising a first part for attachment to an arm of a backhoe or excavator and a second part pivotally mounted to said first part for rotational movement with respect to said first part about an axis, each of said first and second parts comprising at least two laterally spaced side cutting edges extending transverse to said axis and an end cutting edge extending transversely of respective adjacent ends of said side cutting edges, each of the side cutting edges of said first part cooperating with a respective side cutting edge of said second part and the end cutting edge of said first part cooperating with the end cutting edge of said second part to cut said article, wherein the end cutting edge of said first part is curved and arranged to lie at an angle to the end cutting edge of said second part, and said end cutting edge of said first part is positioned to lie tangent to a path on which said end cutting edge of said second part travels as said first part moves with respect to said second part.

* * * * *